Aug. 23, 1949.  C. S. BROWN  2,479,997
VALVED TANK
Filed July 23, 1948  2 Sheets-Sheet 1
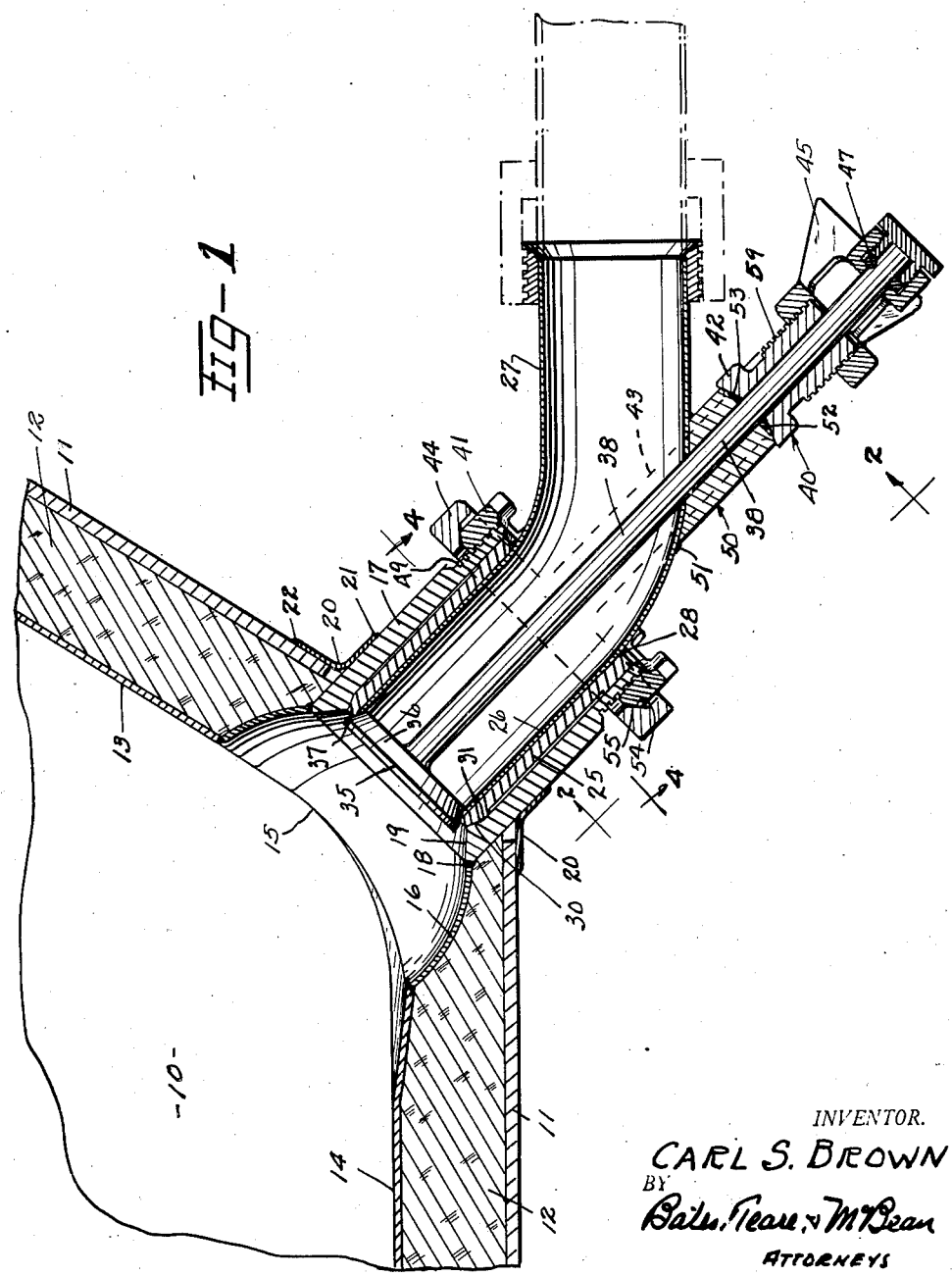
INVENTOR.
CARL S. BROWN
BY
Bates, Teare & McBean
ATTORNEYS Aug. 23, 1949. C. S. BROWN 2,479,997
VALVED TANK
Filed July 23, 1948 2 Sheets-Sheet 2
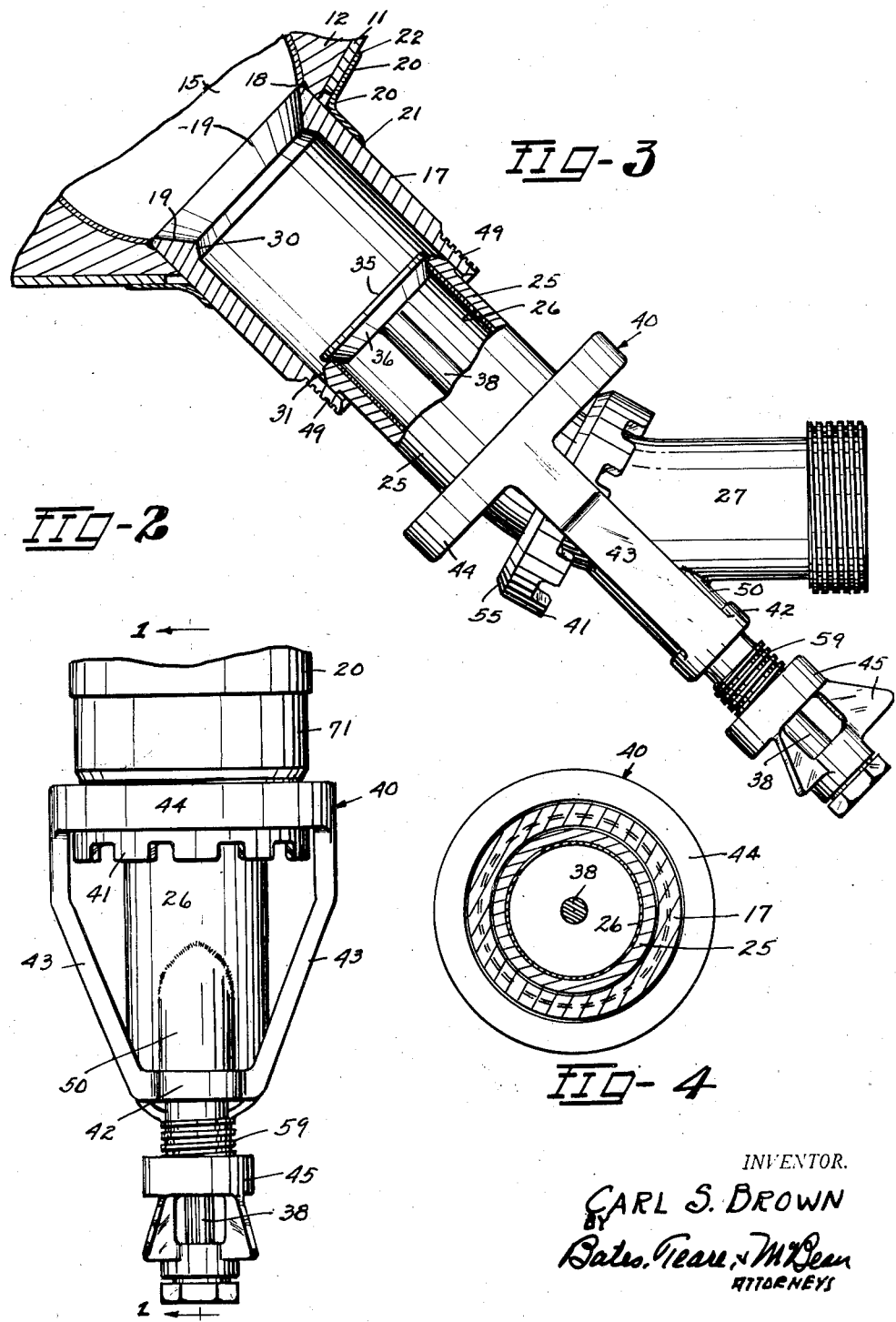
INVENTOR.
CARL S. BROWN
BY
Bates, Teare & McBean
ATTORNEYS Patented Aug. 23, 1949

2,479,997

UNITED STATES PATENT OFFICE 2,479,997

VALVED TANK

Carl S. Brown, Lakewood, Ohio, assignor to Glascote Products, Inc., Cleveland, Ohio, a corporation of Ohio Application July 23, 1948, Serial No. 40,242

7 Claims. (Cl. 137—21)

This invention relates to improvements in liquid treating and storage tanks and to valve fittings therefor. More particularly the invention is concerned with improvements in valve fittings for tanks used in connection with the treatment or storage of milk or other liquid food products.

The general object of the present invention is to provide a tank or other container with an improved valve fitting which will permit the tank to be completely drained and wherein the valve and outlet conduit may be readily removed to facilitate cleaning and sterilization of both the tank and fitting and thus facilitate the use of the tank in connection with liquid food products.

A further object of the present invention is to provide an improved valve fitting particularly adapted for use in connection with containers for liquid food products such as, for instance, milk storage and treatment tanks and the like, and which fitting will comprise a member permanently secured to a tank and in which a combined valve mechanism and outlet conduit valve mechanism is removably positioned, the inner surfaces of the valve mechanism and outlet conduit and the tank member being substantially smooth, free from internal threads and the like, and devoid of crevices in which bacteria could collect.

Other objects and advantages of the invention will become more apparent from the following description, reference being made to a preferred embodiment of the invention illustrated in the accompanying drawings. The essential features of the invention will be summarized in the claims.

In the drawings, Fig. 1 is a fragmentary section taken through a tank and valve fitting and illustrates the valve fitting and assembly in axial section in position on the tank; Fig. 2 is a view, looking in the direction indicated by the arrows on Fig. 1, and illustrates the fitting and valve assembly in position on the tank; Fig. 3 is a view similar to Fig. 1, partially in section, illustrating the valve assembly being removed from the tank; and Fig. 4 is a transverse section as indicated by the lines 4—4 on Fig. 1.

In the drawings, the tank is shown as comprising an inner shell 10 and an outer shell 11 separated by a layer of cork or other insulation material 12. The improved valve mechanism is positioned adjacent the inersection of the end wall 13 and the bottom of the cylindrical wall 14 of the inner shell 10 and projects outwardly at an angle to both walls. As shown, the inner shell 10 is provided with an opening 15 at the intersection of the end wall 13 and the cylindrical wall 14. An outlet member 16 in the form of a spherical segment is secured to the wall of the inner shell at the periphery of the opening 15 as by welding. An outlet tube 17 is secured to the lower periphery of the segment 16 as by a weld 18. The upper end of the tube 17 has a beveled surface 19 which substantially forms a continuation of the inner walls of the spherical segment 16. The tube 17 extends outward through suitable openings in the insulation 12 and the outer shell 11 of the tank and projects therebeyond as illustrated in Fig. 1. A protecting ring 20 is welded to the exterior of the outlet tube as at 21 and to the outer shell 11 of the tank as at 22. Accordingly, fluid tight joints are provided between the outlet tube 17 and the inner and outer walls of the tank.

A valve body comprising a substantially cylindrical sleeve 25 is removably mounted in the outlet tube 17. Mounted within this sleeve and extending outwardly therefrom is an outlet conduit or tube 26, the lower end of which is bent upwardly out of the axis of the sleeve as at 27 so as to extend substantially parallel with the lower wall or axis of the tank. The conduit 26 is in the form of a tubular elbow and is welded or otherwise integrally secured as at its upper end to the inner surface of the sleeve 25, and welded to the lower end of the sleeve 25 as indicated at 28. Accordingly, there is a fluid tight seal between both ends of the sleeve 25 and the conduit 26 making the conduit 26, in effect, an integral part of the valve body 25.

Adjacent its upper end, the inner surface of the outlet tube 17 is provided with an inwardly and downwardly facing beveled surface or shoulder 30 which coacts with an upward and outward beveled surface 31 formed at the upper end of the sleeve 25. When the sleeve is forced upward, bringing the beveled surfaces 30 and 31 together, as will be hereinafter more fully described, there is provided a fluid tight joint between the upper ends of the tube and sleeve.

The sleeve 25 forms a valve seat for a valve member 35. As shown in the drawings, the upper ends of both the sleeve 25 and the conduit 26 are provided with an inwardly and upwardly facing beveled surface 37 to coact with a beveled surface 36 formed on a valve member 35. The valve member is provided with a stem 38 which extends downward axially through the sleeve and conduit and projects outward through the wall of the divergent end 27 of the outlet conduit.

The valve body or sleeve 25 is removably secured or clamped in position in the outlet tube 17 by a bonnet 40 and a retaining nut 41. The bonnet 40 comprises a ring 44 loosely embracing the outlet tube 17 and a hub portion 42 spaced axially therefrom by a pair of diametrically spaced arms 43. The retaining nut 41 is positioned within the bonnet and is provided with internal threads which engage external threads 49 formed on the outer wall of the outlet tube 17 of the tank. The retaining nut 41 is provided with an upwardly facing beveled surface 54 which engages a corresponding beveled surface 55 formed on the lower face of the ring 44 of the bonnet. Accordingly, as the nut 41 is tightened, the bonnet is moved axially toward the tank. The valve stem 38 extends through the hub 42 of the bonnet and the latter engages a boss-like member or tube 50 which is secured to the conduit 26 as by a weld 51. As the bonnet is moved upward by the retaining nut 41, the hub portion 42 thereof exerts pressure against the boss 50, thus urging the entire valve assembly upward, bringing the beveled surfaces 30, 31 into engagement with each other, and securing the valve assembly in position on the tank.

When the structure is in position on the tank, seepage of fluid along the valve stem 35 is prevented by a packing ring 52 which is interposed between the conduit boss 50 and the bonnet hub 42. The tapered or beveled upper surface 53 of the bonnet hub 42 insures the tightening of the packing 52 about the surface of the valve stem 38, consequent upon tightening of the retaining nut 41.

The valve 35 is manually opened and closed by the operation of a handle member 45. This handle is removably secured to the lower end of the valve stem 38 as at 47, in any well-known manner, and is provided with internal threads which coact with external threads 59 formed on the hub member 42 to facilitate raising and lowering of the valve from and to its seat. The arrangement of this handle mechanism is such that when the valve 35 is raised as far as possible from its seat the valve 35 will remain within the spherical segment 16 and thus be protected at all times.

The valve mechanism is readily removed from the tank by manipulation of the retaining nut 41. As illustrated in Fig. 3, the entire valve mechanism including the body or sleeve 25, the outlet conduit 26, the valve member 35, the bonnet 40, and the retaining ring 41, may be removed as a unit from the structure. This is accomplished without the use of internal threads on either the outlet tube 17, the sleeve 25, or the outlet conduit 26. Accordingly, the inner surfaces of these members may be readily cleaned and sterilized. It will also be noted that direct access is had to the interior of these structures. The arrangement is such that the handle 45 may be manipulated to move the valve upward away from its seat a distance to facilitate cleaning of the valve member 35 and the outlet conduit 26 without removing the valve member from the conduit. The opening in the boss 50 and hub 42, through which the valve stem 38 passes, may be of such size as to facilitate cleaning thereof.

I claim:

1. In an apparatus of the class described, a tank having an outlet tube extending outward therefrom and having a downwardly facing beveled internal shoulder adjacent its upper end, a tubular elbow having one leg extending into said outlet tube and engaging said shoulder to form a fluid tight joint therebetween, a valve carried by said elbow to control the passage of fluid from the tank to said elbow, a bonnet having a ring portion loosely surrounding said tube and a hub portion spaced from said ring by a pair of arms and a retainer nut mounted within said bonnet and encircling said elbow to draw the hub portion of said bonnet into engagement with said elbow, said nut having a threaded connection with the external surface of said tube and a shoulder for engagement with said bonnet ring.

2. In an apparatus of the class described, a tank having an outlet tube extending outward and downward therefrom and having a downwardly facing beveled internal shoulder adjacent its upper end, a tubular elbow having one leg extending into said outlet tube and engaging said shoulder to form a fluid tight joint therebetween, a valve carried by said elbow to control the passage of fluid from the tank to said elbow, means to retain said elbow in position in said tube and including a bonnet comprising a ring portion loosely surrounding said tube and a hub portion spaced from the ring portion by spaced arms, and means to draw the hub portion of said bonnet into engagement with said elbow and comprising a retainer nut mounted within said bonnet and encircling said elbow, said nut having a threaded connection with the external surface of said tube and a shoulder for engagement with said bonnet ring portion, and manually operable means carried by said bonnet hub to control the position of said valve.

3. In an apparatus of the class described, a tank having an outlet tube extending outward and downward therefrom, said tube having a downwardly facing internal shoulder adjacent the upper end thereof, an outlet conduit member within said tube and having an upwardly facing beveled surface coacting with said shoulder to form a fluid tight joint therebetween, said member having an upwardly and inwardly facing beveled valve seat surface, said conduit member extending downwardly from said tube and then outwardly at an angle to the axis of said tube, said conduit member having an opening in axial alignment with said tube, a bonnet comprising a ring loosely surrounding said tube and a tubular hub spaced from said ring by spaced arms and in axial alignment with said tube, a valve coacting with said valve seat surface and having a stem extending through the opening in said conduit member and said hub, packing encircling said stem and disposed between said hub and conduit member, and a retaining nut surrounding said tube within said bonnet and having a threaded engagement with said tube and a shoulder for engagement with said ring, whereby tightening of the nut acts to compress said packing and force said outlet member into engagement with said outlet tube.

4. In an apparatus of the class described, a tank having a tube extending outwardly therefrom and forming an outlet, said tube having a downwardly and inwardly facing beveled surface forming a shoulder interiorally thereof and adjacent its upper end, a tubular elbow within said tube and having an upwardly facing beveled surface at its upper end to coact with the shoulder on said tube to form a fluid tight joint therebetween and having an upwardly and inwardly facing beveled valve seat surface, a tubular boss on said elbow in axial alignment with said tube, a bonnet comprising a ring loosely surrounding said tube and a tubular hub spaced from said ring by a yoke and in axial alignment with said boss, a valve coacting with said valve seat surface and having a stem extending through the aligned boss and hub, packing encircling said stem and disposed between said hub and said boss, said ring having a downwardly facing interiorally formed shoulder, and a retaining nut surrounding said elbow within said bonnet and having a threaded engagement with the exterior of said tube and having a shoulder for engagement with said bonnet shoulder, whereby tightening of the retaining nut acts to compress said packing and force said elbow into engagement with said tube.

5. In an apparatus of the class described, a tank having an outlet tube extending outwardly therefrom and connected with the bottom and one end wall of the tank, said tube having a downwardly and inwardly facing beveled surface forming a shoulder interiorly thereof and adjacent its upper end, a sleeve within said tube and having an outwardly and upwardly facing beveled surface at its upper end coacting with said shoulder to form a fluid tight joint therebetween, a drain tube in said sleeve and extending therefrom first downwardly and then outwardly at an angle to the axis of said tube, a tubular boss on said drain tube in axial alignment said said outlet tube, an inwardly and upwardly beveled surface formed on the upper end of said drain tube and sleeve and forming a valve seat surface, a bonnet comprising a ring loosely surrounding said outlet tube and a tubular hub spaced therefrom by a pair of arms, said hub being in axial alignment with said boss, a valve coacting with said valve seat surface and having a stem extending through the aligned boss and hub, said ring having a downwardly facing interiorally formed shoulder, and a clamping ring surrounding said tube within said bonnet and having a threaded engagement with the external surface of said tube and having a shoulder for engagement with said bonnet shoulder, whereby tightening of the clamping ring acts to force said sleeve into engagement with said outlet tube.

6. In an apparatus of the class described, a tank having bottom and end walls, said tank having a spherical segmental outlet cavity adjacent the intersection of one end wall and the bottom wall thereof, an outlet tube having one end thereof abutting the bottom of said cavity and having a downwardly facing internal shoulder adjacent the upper end thereof, an outlet conduit member within said tube and having an upwardly facing beveled surface coacting with said shoulder to form a fluid tight joint therebetween together with an upwardly and inwardly facing beveled valve seat surface, said conduit member extending downwardly from said tube and then outwardly at an angle to the axis of said tube, said conduit member having an opening in axial alignment with said tube, a bonnet comprising a ring portion loosely surrounding said tube and a tubular hub portion spaced from said ring by a pair of spaced arms and in axial alignment with said tube, a valve coacting with said valve seat surface and having a stem extending through the opening in said conduit member and said hub, packing encircling said stem and disposed between said hub and conduit member, and a retaining nut surrounding said tube within said bonnet and having a threaded engagement with said outlet tube and a shoulder for engagement with said ring, whereby tightening of the nut acts to compress said packing and force said outlet member into engagement with said outlet tube, and means interconnecting said bonnet and valve stem to raise and lower said valve into and out of engagement with said valve seat, and wherein the maximum upward movement of said valve is limited whereby said valve is at all times below the upper reach of said segmental cavity.

7. In an apparatus of the class described, a tank having a spherical segmental cavity extending outwardly therefrom, an outlet tube joined at one end to the lower end of said cavity and extending outwardly therefrom, said tube having an upward and inward beveled surface substantially forming a continuation of the wall of said cavity, said tube having a downwardly and inwardly facing beveled surface forming a shoulder interiorly thereof and adjacent its upper end, a sleeve within said tube and having an outwardly and upwardly facing beveled surface at its upper end coacting with said shoulder to form a fluid tight joint therebetween, a drain tube in said sleeve and extending therefrom first downwardly and then outwardly at an angle to the axis of said tube, a tubular boss on said drain tube in axial alignment with said tube, an inwardly and upwardly beveled surface formed on the upper end of said drain tube and sleeve and forming a valve seat surface, a bonnet comprising a ring loosely surrounding said outlet tube and a tubular hub spaced therefrom by a pair of arms, said hub being in axial alignment with said boss, a valve coacting with said valve seat surface and having a stem extending through the aligned boss and hub, packing encircling said stem and disposed between said hub and boss, said ring having a downwardly facing interiorally formed shoulder, and a clamping ring surrounding said tube within said bonnet and having a threaded engagement with the external surface of said tube and having a shoulder for engagement with said bonnet shoulder, whereby tightening of the clamping ring acts to compress said packing and force said sleeve into engagement with said outlet tube, and means to limit the movement of said valve away from its seat whereby said valve remains in said segmental cavity when moved upward away from its seat.

CARL S. BROWN.

REFERENCES CITED

The following references are of record in the file of this patent:

UNITED STATES PATENTS

| Number | Name | Date |
| --- | --- | --- |
| 1,652,510 | Allen | Dec. 13, 1927 |
| 1,939,495 | Goecke | Dec. 12, 1933 |